Aug. 1, 1939.  J. W. LEIGHTON  2,167,984
INDIVIDUAL SUSPENSION
Filed Sept. 30, 1936
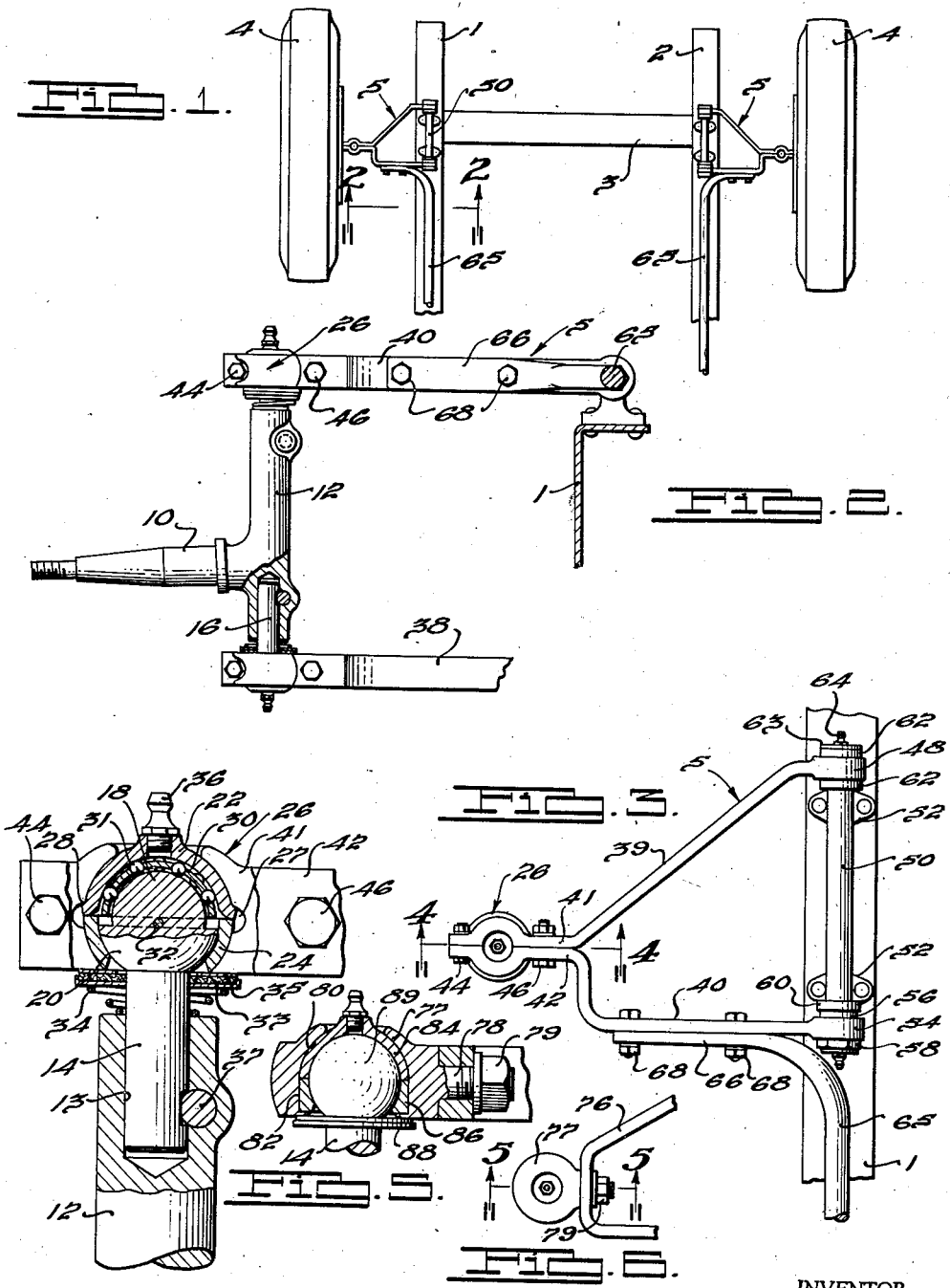
INVENTOR.
John W. Leighton.
BY
Harness, Dickey, Pierce & Hann.
ATTORNEYS.

Patented Aug. 1, 1939

2,167,984

UNITED STATES PATENT OFFICE 2,167,984

INDIVIDUAL SUSPENSION

John W. Leighton, Port Huron, Mich.

Application September 30, 1936, Serial No. 103,236

5 Claims. (Cl. 280—96.2)

The invention relates generally to motor vehicles and it has a particular relation to independent wheel suspensions.

One object of the invention is to provide improvements in independent wheel suspensions for the front steering wheels of an automobile wherein the load of the latter is transferred to the top of the steering knuckle support.

Another object of the invention is to provide an improved king pin construction for an independent wheel suspension.

A further object is to provide an improved form of ball and socket joint particularly adapted for an independent wheel suspension of the type here involved and an improved arrangement by which the ball and socket joint is utilized to connect the king pin in the suspension.

Further objects of the invention will become apparent from the following specification, the accompanying drawing and the appended claims.

In the drawing, wherein like numerals are applied to like parts in the several views;

Fig. 1 is a plan view of the forward portion of an automobile chassis, showing the independent suspension for the front wheels of the automobile;

Fig. 2 is a transverse sectional view taken on the line 2—2 of Fig. 1;

Fig. 3 is a top plan view of the structure shown in Fig. 2;

Fig. 4 is a transverse sectional view taken on the line 4—4 of Fig. 3;

Fig. 5 is a sectional view taken on the line 5—5 of Fig. 6 showing a modification of the structure shown in Fig. 4;

Fig. 6 is a plan view of the modified structure shown in Fig. 5.

As shown best in Fig. 1 the independent wheel suspension forming the subject matter of the present invention is adapted for use on a conventional automobile chassis comprising the longitudinal frame members 1 and 2 and a transverse front frame member 3 which rigidly connects the frame members 1 and 2. A pair of front steering wheels 4 are mounted for independent vertical movement with respect to the frame and for steering movement with respect thereto by means of a pair of independent wheel suspension structures indicated generally at 5.

The two wheel suspensions are identical and hence description of the wheel suspension structure for the left hand wheel which is shown in detail in Figs. 2, 3 and 4 will suffice for both. This suspension comprises a wheel spindle 10 upon which the wheel 4 is adapted to be journaled and the spindle is formed integrally with a king pin member 12 which in turn is provided with axially extending bores 13 in its ends adapted to receive pins 14 and 16, respectively. As shown best in Fig. 4 the upper pin 14 is provided at its upper end with a generally spherical head which forms the ball member of a ball and socket connection between the king pin and upper wishbone. While certain advantages of applicant's invention are secured regardless of the nature of this ball and socket joint the specific form shown in Fig. 4 is of peculiar advantage in that it embodies a ball bearing thrust bearing which as hereinafter described sustains the load of the vehicle. Accordingly, in this form of the invention the head on pin 14 comprises an upper spherical portion 18 and a lower spherical portion 20 of larger diameter than the portion 18. The two portions are concentric but portion 18 is preferably slightly greater in extent than one-half of the sphere and the two are separated along a plane extending transversely of the pin 14.

The head on pin 14 is received within a spherical housing formed of a pair of stamped metal, partially spherical bearing members 22 and 24, respectively, which in turn are carried by a spherical housing 26. The housing 26 is provided with an annular groove 27 lying in a plane transverse to the axis of pin 14 and the peripheral edge of the upper sheet metal member 22 is bent outwardly at 28 into the groove. This arrangement serves to hold the member 22 against vertical turning movement within the housing 26.

Positioned within the space between the portion 18 of the head on pin 14 and the interior surface of the pressed metal member 22 is a spherical ball retaining plate 30 having a plurality of apertures therein, within which are received a plurality of ball bearings 31. In order to prevent rocking movement of the plate 30 about an axis parallel to the axis of wheel 4 there is provided a pin 32 having a pressed fit within the spherical portion 18 of the head on pin 14 and extending outwardly into the space between the lower edge of the plate 30 and the shoulder formed by the juncture of spherical portions 18 and 20 of the head. This pin restricts free movement of the plate 30 and balls 31 with respect to the head 18 to rotation about the axis of pin 32. Since it is about this axis that the pin 14 rotates with respect to the socket 26, movement of the head on pin 14 will rock the plate 32 back and forth within the space between the head and plate 22. While the ball retaining member is preferably formed as illustrated, as a simple semi-spherical apertured plate, it is apparent that any desired form of spherical ball cage may be utilized.

When the ball and socket joint is assembled a sealing plate 33 is fitted over the pin 14 and held against the lower face of the housing 26 by means of a spring 34, which in turn bears against the upper end of the king pin 12. A suitable sealing washer 35 is provided between the plate 33 and the housing 26 to seal the lower end of the ball and socket joint. The upper end is closed by means of the stamping 22, which is provided with a suitable lubricating fitting 36. The pin 14 is held in position within the king pin 12 by means of a tapered drive pin 37, as shown best in Fig. 4.

The head on the lower pin 16 and the ball and socket joint associated therewith is preferably formed as a simple sphere of uniform diameter equal to the internal diameter of the socket, and no ball bearings are utilized in connection with this lower ball and socket joint. In all other respects the lower joint may be similar to that utilized in connection with the upper pin 14, or it may correspond to the joint hereinafter described in connection with Figs. 5 and 6. In either event is serves to connect the lower end of the king pin to a lower wishbone 38 which in turn is suitably pivoted to the vehicle in any desired manner for rotation about an axis parallel to the member 1.

As shown best in Fig. 3, the upper wishbone of the independent suspension is formed of a pair of bars 39 and 40 which are stamped into the form illustrated in Fig. 3. The outer extremities of the bars 39 and 40 extend parallel to each other at 41 and 42, respectively, and these end portions are formed by the stamping operation into semi-spherical portions which cooperate to form the spherical housing 26 for the ball and socket joint, previously described. At each side of the spherical housing 26 the extremities 41 and 42 of bars 39 and 40 are secured together by means of bolts 44 and 46.

The inner end of bar 39 is provided with an internally threaded eye member 48 adapted to be threaded upon a journal 50 having threaded extremities. The journal 50 in turn is provided with ears 52 by means of which it may be bolted or otherwise fixedly secured to the frame member 1 of the vehicle. The inner end of the bar 40 is pivotally connected to the opposite threaded extremity of journal 50 by a threaded bushing member in the manner disclosed in detail in applicant's copending application, Serial No. 69,785, filed March 20, 1936. Briefly, this connection includes an eye 54 on bar 40 which has an interior bore considerably larger than adjacent threaded extremity of journal 50, and a bushing 56 having a hexagonal head 58 threaded upon the adjacent extremity of the journal 50 and into the eye member 54. The outer surface of the bushing 56 is initially provided with threads which are adapted to cut threads in the non-threaded internal bore in eye 54, as the bushing is threaded into the eye member and simultaneously on to the journal 50. This provides a relatively tight fit between the eye 54 and bushing 56 with the result that the relative rotation during pivotal movement of the wishbone takes place between the bushing and the journal, which members form a threaded bearing. A rubber ring 60 is provided between the inner end of the bushing 56 and the projecting ears 52 on journal 50 for the purpose of sealing the open end of bushing 56 to retain the lubricant. Similarly a pair of rubber rings 62 are provided on opposite sides of the eye member 48 on bar 39 at the opposite end of journal 50; and the outer ring 62 is held against displacement from the extremity of the journal 50 by means of a washer 63 which is locked against the end of journal 70 by means of the head on a lubricating fitting 64. The lubricating fitting is threaded into a suitable opening in the journal 70, which opening communicates with a lubricant passage leading to the threaded bearing surfaces between eye 48 and the adjacent extremity of journal 50.

It will be observed that by reason of the arrangement just described the upper wishbone may be assembled upon the journal 50 by first inserting the journal loosely within eye 54 with the journal inclined at an angle with respect to the axis of eye members 48 and 54. Thereupon the journal 50 may be aligned with and threaded into the eye 48 until it reaches the desired position with respect to the bar 39. Hereafter the threaded bushing 56 may be threaded simultaneously onto the opposite extremity of journal 50 and into eye member 54 to complete the assembly.

Spring means are provided for resisting pivotal movement of the upper wishbone with respect to the frame in order to support the weight of the vehicle. As shown in Figs. 1, 2 and 3 the spring member is of the tortional type, and comprises an elongated spring rod 65 extending parallel to the frame member 1 a substantial distance, and being fixedly secured at the rear end thereof in any desired manner, not shown. This elongated spring rod 65 is preferably positioned on the axis of journal 50 and its forward extremity 66 is bent at right angles to the main body of the rod and is bolted rigidly to the arm 40 of the upper wishbone of the spring suspension. This tortional spring per se forms no part of applicant's invention, although invention is claimed by applicant in the combination of other features with a spring of this type and with any spring operable upon the upper wishbone.

It will be observed that by reason of the fact that the load supporting spring resists rotation of the upper wishbone with respect to the frame, the load supporting forces exerted by the wheel 4 are transmitted to the upper wishbone through the ball and socket joint and thence to the torsional spring 65. It is for this reason that it is exceedingly important to provide a low friction joint for the upper wishbone, since the entire load supporting forces are transmitted by thrust through this joint. Not only is a ball and socket joint an effective means for transmitting this large thrust force, but it will be apparent that since the spring 65 is secured to only one arm of the upper wishbone that the loads on the wishbone will tend to distort the same in such a manner as to cause a bending of any type of pivotal connection except a ball and socket joint. Moreover, in view of the heavy thrust forces exerted through this ball and socket joint, the provision of a ball bearing arrangement for taking the thrust between the ball and socket is of considerable importance.

As a further feature of the invention it is to be noted that when upwardly directed forces are exerted by the king pin 12 upon the outer extremity of the upper wishbone, because of the nature of the spring 65 which resists such force there will be a tendency of the inner end of the upper wishbone to move upwardly, thus placing the loaded zone of the threaded bearing at the lower side thereof. It is for this reason that the internal bearing or journal member 50 is fixed to the frame member instead of being fixed to the wishbone as in certain prior constructions. By reason of the arrangement disclosed in this application, the loaded zone of the bearing is located at the underside thereof at which point the lubricant will tend to collect and remain, hence insuring an adequate supply of lubricant at the loaded zone at all times.

In Figs. 5 and 6 is disclosed a modified form of the upper wishbone and ball and socket joint. In the structure there shown the upper wishbone is formed as a single stamped bar 76; and a forged ball and socket housing 77 is secured to the bar by means of a bolt 78 formed integrally with the housing 77 and adapted to extend through a suitable opening in the longitudinally extending outer extremity of the bar 76, and to be held in fixed position therein by means of a nut 79. The housing 77 is provided with an opening comprising an upper semi-spherical portion 80 and a communicating lower cylindrical portion 82 of the same diameter as the spherical portion 80 and extending tangent thereto. A stamped upper ball race 84, similar to the ball race 22 described in connection with Fig. 4, is seated within the spherical portion 80 of housing 77 and a forged or stamped lower race 86 is fitted within the cylindrical portion 82 of the housing 77. Both of these members 84 and 86 are inserted through the lower end of the opening within the housing 77 whereupon the edge of the opening is peened over at 88 to lock the members 84 and 86 in position. In this form of the invention the head on pin 14 is illustrated as a simple ball bead 89 adapted to fit the spherical socket formed by stampings 84 and 86. It is apparent, however, that this ball and socket joint may be of the ball bearing type shown in Fig. 4 with the same advantages as in that figure of the drawing. Likewise, it is apparent that, if desired, the simple ball bead 89 may be utilized in the ball and socket joint shown in Fig. 4.

It is apparent from the above that there is provided an exceedingly simple independent wheel mounting wherein the forces incident to the weight of the vehicle are transmitted by direct axial thrust through the king pin 12 and a ball bearing ball and socket joint to the outer extremity of an improved form of wishbone, which in turn is so mounted and sprung that the loaded zones of the bearings at its inner end are located at the lower portions of those bearings where they may be adequately lubricated. The ball and socket joint forms an exceedingly inexpensive and effective pivotal connection between the king pin and the wishbone, the particular form of ball bearing ball and socket joint disclosed being particularly adapted for transmitting the severe thrust forces encountered by independent wheel suspension during normal use, and the particular form of upper wishbone disclosed being particularly adapted for cooperation with a pivotal connection of the ball and socket type at the upper end of the king pin. Accordingly, all of the features of the structure cooperate with each other to produce an improved and exceedingly satisfactory construction.

While only two forms of the invention have been shown and described, it is apparent that others are available within the spirit of the invention as set forth in the above specification and illustrated in the drawing and within the scope of the appended claims.

I claim:

1. In an independent wheel suspension for a steering wheel, a vehicle frame, a wheel supporting member, upper and lower links pivoted to the frame at their inner ends, means connecting the wheel supporting member to the lower link for universal movement with respect thereto, a ball and socket connection between the wheel supporting member and the upper links, said connection including spaced partially spherical inner and outer members having a plurality of ball bearings between and in rolling engagement with the spherical surfaces thereof and a cage between the members for holding said balls in position relative to each other, and spring means associated with the upper link for supporting the vehicle.

2. In an independent wheel suspension, a vehicle frame, upper and lower links pivoted to the frame at their inner ends on parallel axes, a wheel spindle having an integral king pin member extending approximately at right angles thereto, means pivotally connecting the lower end of the king pin to the lower link, the upper end of said king pin being provided with an axially extending bore, a pin received in said bore, a ball head integral with the upper end of said pin, means forming a spherical housing at the outer end of the upper link for receiving said ball head, and spring means associated with the upper link for supporting the vehicle through said link.

3. In an independent wheel suspension, a vehicle frame, upper and lower links pivoted to the frame at their inner ends on parallel axes, a wheel spindle having an integral king pin member extending approximately at right angles thereto, said king pin having bores in its ends, a pin secured in each of said bores, said pins having integral ball heads, and means forming ball and socket housings on the outer ends of the links for receiving said ball heads respectively.

4. In an independent wheel suspension, a vehicle frame, upper and lower links pivoted to the frame at their inner ends on parallel axes, a wheel spindle having an integral king pin member extending approximately at right angles thereto, said king pin having bores in its ends, a pin secured in each of said bores, said pins having integral ball heads, means forming ball and socket housings on the outer ends of the links for receiving said ball heads respectively, and means for sealing said housings at the opening through which said pins extend comprising a sealing plate slidably mounted on each of said pins and a spring between the wheel supporting member and each plate for holding it in sealing engagement with the adjacent housing.

5. In an independent wheel suspension for a steering wheel, a vehicle frame, a wheel supporting member, a lower link pivoted to the frame and to said member, a ball element of a ball and socket joint secured to the wheel supporting member, and an upper link formed of a pair of complementary stampings pivoted at their inner ends on spaced aligned bearings to the vehicle frame and having their outer ends secured together and shaped to define the housing socket for said ball.

JOHN W. LEIGHTON.